Figure 1:
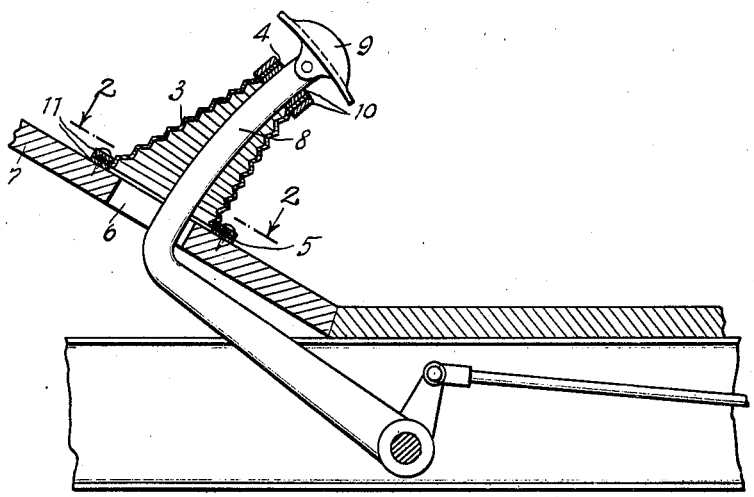

Apr. 17, 1923.

G. A. MILKIE

AUTOMOBILE PEDAL ATTACHMENT

Filed Sept. 19, 1922

1,452,431

WITNESSES

INVENTOR
George A. Milkie
BY
ATTORNEY

Patented Apr. 17, 1923.

1,452,431

UNITED STATES PATENT OFFICE.

GEORGE A. MILKIE, OF BROOKLYN, NEW YORK.

AUTOMOBILE PEDAL ATTACHMENT.

Application filed September 19, 1922. Serial No. 589,161.

*To all whom it may concern:*

Be it known that I, GEORGE A. MILKIE, a citizen of the United States, and a resident of the city of New York, borough of Brooklyn, in the county of Kings and State of New York, have invented a new and Improved Automobile Pedal Attachment, of which the following is a full, clear, and exact description.

This invention aims to provide as a new article of manufacture, an automobile pedal attachment of exceedingly simple and inexpensive construction and adapted to be mounted on such a pedal and associated with the floor-board through which the pedal projects into the driver's compartment; a particular object being to provide such an attachment and one which may be combined with the other parts mentioned and securely and permanently stationed in operative relation thereto without the use of any special tools and in a very few minutes of time.

It is well-appreciated that much of the discomfit in driving, especially in hot weather, is due to the necessary design of the slots in the floor-board and through which the clutch, brake, and accelerator pedals project, whereby these slots are of greater cross-sectional area than the pedal rods. This is particularly so in those designs where the pedal rods project through slots in a removable floor-board and where the board has to be removed by lifting the same to clear the pedals by way of the pedal rod slots, or where the brake and clutch pedal rods, as is generally the approved practice, are pivotally mounted rather than reciprocably. Even where a pedal rod is reciprocable, if the same fits its slot very snugly, the pedal may not be depended on to delicately and freely respond to foot pressures by the driver. On the other hand, if a pedal rod does not, for any reason, fit its slot snugly, such a fit, of course, being impossible in a rocking rod, the driver's compartment is not only heated to an exceedingly uncomfortable extent by the inrush of hot streams of air from the engine, but great additional discomfit is experienced from the oil and gas fumes borne by such inrush of heated air; these streams usually discharging in such a way that they blow up the trousers leg of the driver and also sweep over the driver's face. As a result, automotive engineers and designers have so far not been able to solve the difficulty of eliminating such heated streams and obnoxious vapors in the driver's compartment, while, at the same time, avoiding reductions in the dimensions of the pedal slots to such an extent as to sacrifice efficient action.

The prime object of the present invention is to provide a new article of manufacture, readily attachable to practically all pedal and floor-board designs now on the market, whether the pedal be for a clutch, brake, or accelerator, which will at once overcome all the disadvantages above noted and at the same time improve the inside appearance of any motor car by not only covering the ugly slot itself, but also by dressing the pedal rod.

Another object of the invention is to provide not only such a novel pedal attachment, and one of the simple and inexpensive construction first referred to, but an attachment which will close the slot in the floor-board effectively and permanently in a fume-tight manner, without interfering with or hindering pedal action in any way or to any undesirable degree.

The invention will be more clearly understood from the following description when taken in connection with the accompanying drawing, showing an embodiment of the invention as at present preferred, but one merely illustrative of the general nature of the invention; the scope of protection contemplated being indicated by the appended claim.

In this drawing—

Figure 2:
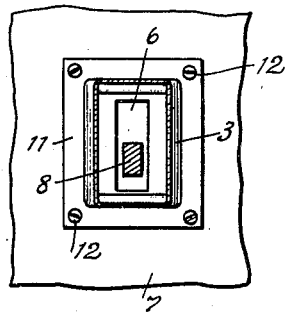

Figure 1 is a vertical sectional view showing the new attachment associated with a floor-board and pedal; and Figure 2 is a section on the line 2—2 of Figure 1.

Similar reference characters refer to similar parts in both views.

Such embodiment, it will be seen, is here comprised principally of a sleeve or bellows member 3 having at its upper end a reduced neck portion 4 and at its lower end an exterior laterally-extended flange portion 5.

As shown, the bellows member is rectangular in cross-section and the flange is also rectangular, the intermediate portion of the attachment, that is the bellows proper, being of gradually decreasing cross-section from bottom to top. In this connection, it will be understood that the cross-sectional area of the sleeve or bellows opposite the flange portion 5 is equal to or slightly greater than the cross-sectional area of the slot in the floor-board of the particular motor car for which the attachment is designed, or of the largest slot of the one of several motor cars for all of which the attachment is designed.

The new attachment being herein described associated with pedal and floor-board, such a slot is indicated at 6 in a floor-board 7, a pedal rod 8 projecting upwardly through the slot and carrying at its upper end a pedal 9.

Neck portion 4 of the new attachment is provided with inner and outer collars 10 fitting very snugly the inner and outer surfaces of the neck portion.

Flange portion 5 of the new attachment is provided with top and bottom frames of rigid material 11 and forming with such flange portion, the base of the bellows to be attached by suitable screws 12 to the floor-board.

The bellows proper, the neck portion 4 and the flange portion 5 in the present embodiment are formed of a unitary piece of flexible material, desirably leather. The inner and outer collars are both of an elastic material, as rubber, and cemented in place on the neck portion. The frames of rigid material are most conveniently made as sheet metal stampings.

Various slight changes might be made in the general form and arrangement of the parts described without departing from the invention, and hence I do not limit myself to the precise details set forth but consider myself at liberty to make such changes and alterations as fairly fall within the spirit and scope of the appended claim. It is obvious, for example, that the new attachment need not necessarily be rectangular in cross-section, but instead may be made in various shapes and sizes to fit various shapes of slots and forms of pedal rods in use on different motor cars and further varied with particular regard to the distance the pedal moves in action. It is especially to be understood that while I have obtained the best results from utilizing a plurality of rigid members 11 and a plurality of elastic members 10, in combination with the flexible bellows proper, it may be found in practice that, from the standpoint of fume-tight connections between the new attachment and the floor-board and the pedal rod, only one such elastic member or only one such rigid member, or one only of both types of members may satisfactorily be employed.

I claim:

As a new article of manufacture, a fume-trap for an automobile pedal including a bellows member of decreasing cross-section from bottom to top, a neck portion including a ring of elastic material, a base including a plurality of flat frame members of rigid material and a sheet member of flexible material interposed between said frame members, and a sleeve of flexible material having at one end a reduced portion constituting with said ring said neck portion, said sleeve being formed at its other end to establish said sheet member.

GEORGE A. MILKIE.